US008644848B2

(12) United States Patent
Williams et al.

(10) Patent No.: US 8,644,848 B2
(45) Date of Patent: Feb. 4, 2014

(54) SYSTEMS AND METHODS FOR LOCATION SENSITIVE ALERTS IN A MOBILE COMMUNICATION NETWORK

(75) Inventors: David Lothele Williams, Menlo Park, CA (US); Rohan Koduvayur Krishnan Chandran, Sunnyvale, CA (US); Kelvin Voon-Kit Chong, Mountain View, CA (US); Srinivas A. Mandyam, San Jose, CA (US); Krishna Vedati, Los Altos, CA (US)

(73) Assignee: Yellowpages.com LLC, Glendale, CA (US)

( * ) Notice: Subject to any disclaimer, the term of this patent is extended or adjusted under 35 U.S.C. 154(b) by 96 days.

(21) Appl. No.: 13/310,644

(22) Filed: Dec. 2, 2011

(65) Prior Publication Data

US 2013/0143586 A1 Jun. 6, 2013

(51) Int. Cl.
*H04W 24/00* (2009.01)

(52) U.S. Cl.
USPC .......................................... 455/456.1

(58) Field of Classification Search
USPC ...................................... 455/456.1
See application file for complete search history.

(56) References Cited

U.S. PATENT DOCUMENTS

| | | | |
|---|---|---|---|
| 2004/0077347 A1* | 4/2004 | Lauber et al. | 455/428 |
| 2004/0174844 A1* | 9/2004 | Cho et al. | 370/328 |
| 2006/0270421 A1* | 11/2006 | Phillips et al. | 455/457 |
| 2007/0299772 A1* | 12/2007 | Mastie et al. | 705/39 |
| 2008/0132252 A1* | 6/2008 | Altman et al. | 455/457 |
| 2008/0258913 A1* | 10/2008 | Busey | 340/540 |
| 2010/0070360 A1* | 3/2010 | Gilbert et al. | 705/14.19 |
| 2010/0093380 A1* | 4/2010 | Gustafsson | 455/466 |
| 2010/0216491 A1* | 8/2010 | Winkler et al. | 455/457 |
| 2011/0288911 A1* | 11/2011 | Barnes, Jr. | 705/14.1 |
| 2012/0220277 A1* | 8/2012 | Gonynor | 455/414.2 |
| 2013/0031169 A1* | 1/2013 | Axelrod et al. | 709/204 |

* cited by examiner

*Primary Examiner* — Lester Kincaid
*Assistant Examiner* — Andy Gu
(74) *Attorney, Agent, or Firm* — Kilpatrick Townsend & Stockton LLP

(57) ABSTRACT

Systems and methods are provided for providing alerts to users of mobile communications networks based, at least in part, on users' real-time geospatial location at a point in time. Users and third parties set up alerts for themselves or other users that comprise alert details and trigger criteria. Alert details comprise, inter alia, text or other data defining a message to the user to whom the alert is directed. Trigger criteria comprise a geo-fenced area and dates times the alert is active. When the a user enters a geo-fenced area associated with an alert at such date and time the alert is active, the alert is transmitted to the user.

20 Claims, 4 Drawing Sheets

SYSTEMS AND METHODS FOR LOCATION SENSITIVE ALERTS IN A MOBILE COMMUNICATION NETWORK

FIELD OF THE TECHNOLOGY

At least some embodiments disclosed herein relate, in general, to systems for providing alerts to users of mobile communications networks based, at least in part, on users' real-time or predicted geospatial location at a point in time.

BACKGROUND

Mobile communications networks and mobile communication devices have long been used to alert end users of various conditions. These alerts may relate to temporal events such as a calendar entry like a meeting or a birthday. Such alerts could additionally relate to communications events, for example, receipt of text messages. Many mobile communications networks are additionally aware of end-users' geospatial location in real-time, as well as users' demographic information and online activities.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Various embodiments of the systems and methods provide alerts to users of a mobile communication network, such that such alerts are relevant to, inter alia, users' current geospatial location and the current time. In an embodiment, the systems and methods disclosed herein provide the capability for end-users, businesses and other entities to create alerts that are triggered when a user enters or exits a geo-fence, under specific conditions such as, for example, at a specific time of day or a specific date.

As used herein, a geo-fence refers to a virtual perimeter for a real-world geographic area. In an embodiment, geo-fences can be dynamic such as, for example, a radius around a user's mobile device. In an embodiment, a geo-fence can be a predefined set of boundaries such as, for example, an area around a business location, a neighborhood, a city or a state. In an embodiment, a geo-fence can be any arbitrary two-dimensional or three-dimensional closed geometric figure of any shape or size tied to one or more specific locations.

Figure 1:
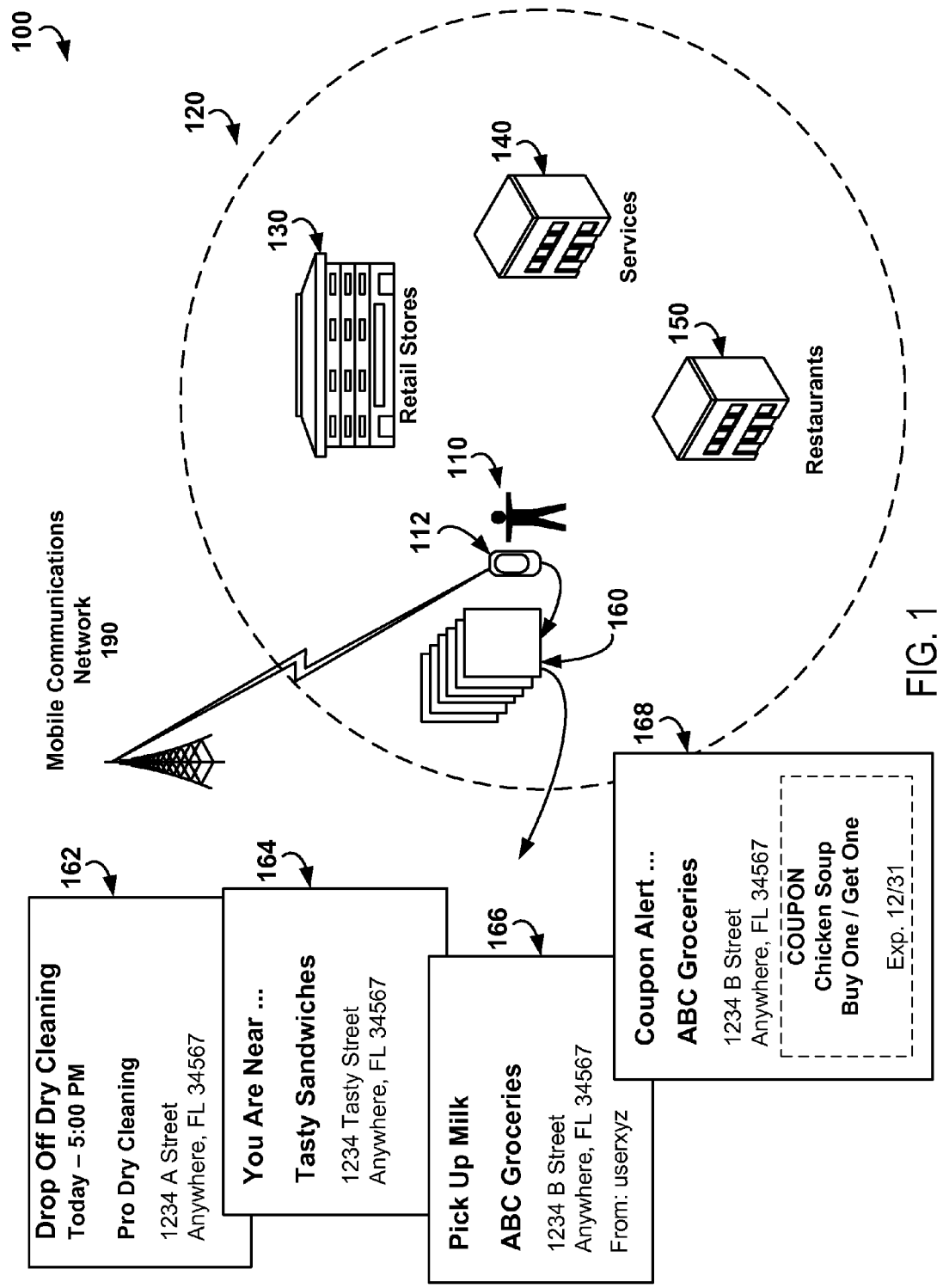
FIG. 1 shows a conceptual illustration of the operation of various embodiments of the systems and methods of the present disclosure.

FIG. 1 shows a conceptual illustration 100 of the operation of various embodiments of the systems and methods of the present disclosure.

A user 110 is linked to a mobile communications network 190 via the user's mobile device 112. The mobile communications network 190 can be any type of mobile communications network such as, without limitation, CDMA, GSM and satellite-based networks. The mobile device 112 can be any type of portable device capable of communicating with the mobile network such as, without limitation, cell phones, smart phones, PDAs, tablet PC's laptop PCs and PDAs. In various embodiments, the mobile communications network 190 provides voice and messaging capabilities and may provide access to other networks such as, for example, other mobile communications networks and/or the Internet.

The mobile communications network 190 tracks the geospatial location of the user's mobile devices 112 in real-time or near-time as the devices move with the user 110 from point to point. In various embodiments, the location of the mobile device is determined using any technique now known, or later to be developed, in the art. For example, in an embodiment, the mobile device 112 itself automatically determines its own geospatial location via built in GPS capabilities and communicates the location to the mobile communications network 190 periodically or continuously. Additionally or alternatively, in an embodiment, the mobile communications network 190 determines the location of the user's 110 mobile device 112 using capabilities inherent in the network such as by triangulation or by determining the nearest transmission tower to the device.

In the illustrated example, the users 110 is at a geospatial position within the coverage area of the mobile communications network 190. The mobile communications network 190 is aware of, and actively tracks, the geospatial position of the user's 110 mobile device 112. The user interacts with their mobile devices 112 in a variety of ways including, without limitation, sending and receiving voice and text messages, sending and receiving emails, searching for subject matter using Internet based search and/or directory services and a variety of mobile apps hosted by their client devices.

In the illustrated example, the user 110 is currently is within a geo-fenced area that includes of a variety of businesses of interest to the user, including retail stores 130, personal services 140 and restaurants 150. In response to the user's 110 current geospatial position and the current date and time, the user's mobile device 110 receives, via the mobile communication network 190, a set of alerts 160 relating to the user, the current date and time and businesses within the geo-fenced area 110.

In an embodiment, at least some of the alerts were previously set by the user 110 using facilities provided by the mobile communication service 190 via, for example, a mobile app on the mobile device 112 or a website generally accessible over the Internet (not shown). In an embodiment, at least some of the alerts were previously set by a user other than the user 110 of the mobile device (e.g. friends, relatives and so forth). In an embodiment, at least some of the alerts were previously set by a third party (e.g. a business).

In the illustrated example, the user 110 receives an alert 162 at 5:00 PM reminding the user to drop off clothes at a dry cleaning service. The alert 162 is triggered, in part, because the user has crossed into a geo-fenced area 120 including a dry cleaning service 140. The alert 162 is additionally time restricted, and is only triggered between 5:00 PM and 8:00 PM, a time frame which may correspond to, for example, the time the user 110 is commuting home from work. In an embodiment, the alert is only triggered if a specific dry cleaning service 140 is located within the geo-fenced area 120. In an embodiment, the alert is triggered if any dry cleaning service 140 is located within the geo-fenced area 120.

In the illustrated example, the user 110 additionally receives an alert 164 that the user 110 is near a sandwich shop 150. The alert 164 is triggered, in part, because the user has crossed into a geo-fenced area 120 including a sandwich shop 140. The alert 164 is additionally time restricted, and is only triggered between 12:00 PM and 1:30 PM on weekdays, a time frame which may correspond to, for example, the time the user 110 eats lunch during the business week. In an embodiment, the alert is only triggered if a specific sandwich shop 150 is located within the geo-fenced area 120. In an embodiment, the alert is triggered if any sandwich shop 150 is located within the geo-fenced area 120. In an embodiment, the alert is triggered if any restaurant 150 is located within the geo-fenced area 120. In an embodiment, the alert is triggered if any business 130, 140 and 150 that sells food is located within the geo-fenced area 120.

In the illustrated example, the user 110 additionally receives an alert 166 reminding the user to pick up milk. The alert 166 is triggered, in part, because the user has crossed into a geo-fenced area 120 including a grocery store. The alert 164 is additionally time restricted, and is only triggered between 8:00 AM and 10:30 PM, a time frame which may correspond to, for example, the times grocery stores are usually open. In an embodiment, the alert is only triggered if a specific grocery store 150 is located within the geo-fenced area 120. In an embodiment, the alert is triggered if any grocery store 150 is located within the geo-fenced area 120. In an embodiment, the alert is triggered if any business 130, 140 and 150 that sells food is located within the geo-fenced area 120. In the illustrated example, the alert 166 was set by another user, "userxyz". For example, a wife could set an alert for her husband to pick up milk on his way home from work.

In the illustrated example, the user 110 additionally receives an alert 168 reminding the user that the user has a coupon for chicken soup. The alert 168 is triggered, in part, because the user has crossed into a geo-fenced area 120 including a grocery store. The alert 164 is additionally time restricted, and is only is only triggered for dates prior to December 31 of the current year, a time frame which may correspond to, for example, the expiration date of the coupon. In an embodiment, the alert is only triggered if a specific grocery store 150 is located within the geo-fenced area 120. In an embodiment, the alert is triggered if grocery store 150 is located within the geo-fenced area 120. In an embodiment, the alert is triggered if any business 130, 140 and 150 that sells food is located within the geo-fenced area 120. In the illustrated example, the alert 168 was set by a third-party. In an embodiment, the third-party is a specific grocery store 130 where the coupon must be redeemed. In an embodiment, the third-party is a grocery store chain 130 where the coupon must be redeemed. In an embodiment, the third-party is a manufacturer or other advertiser (not shown) that is promoting the product to which the coupon relates (e.g. a manufacturer coupon).

Figure 2:
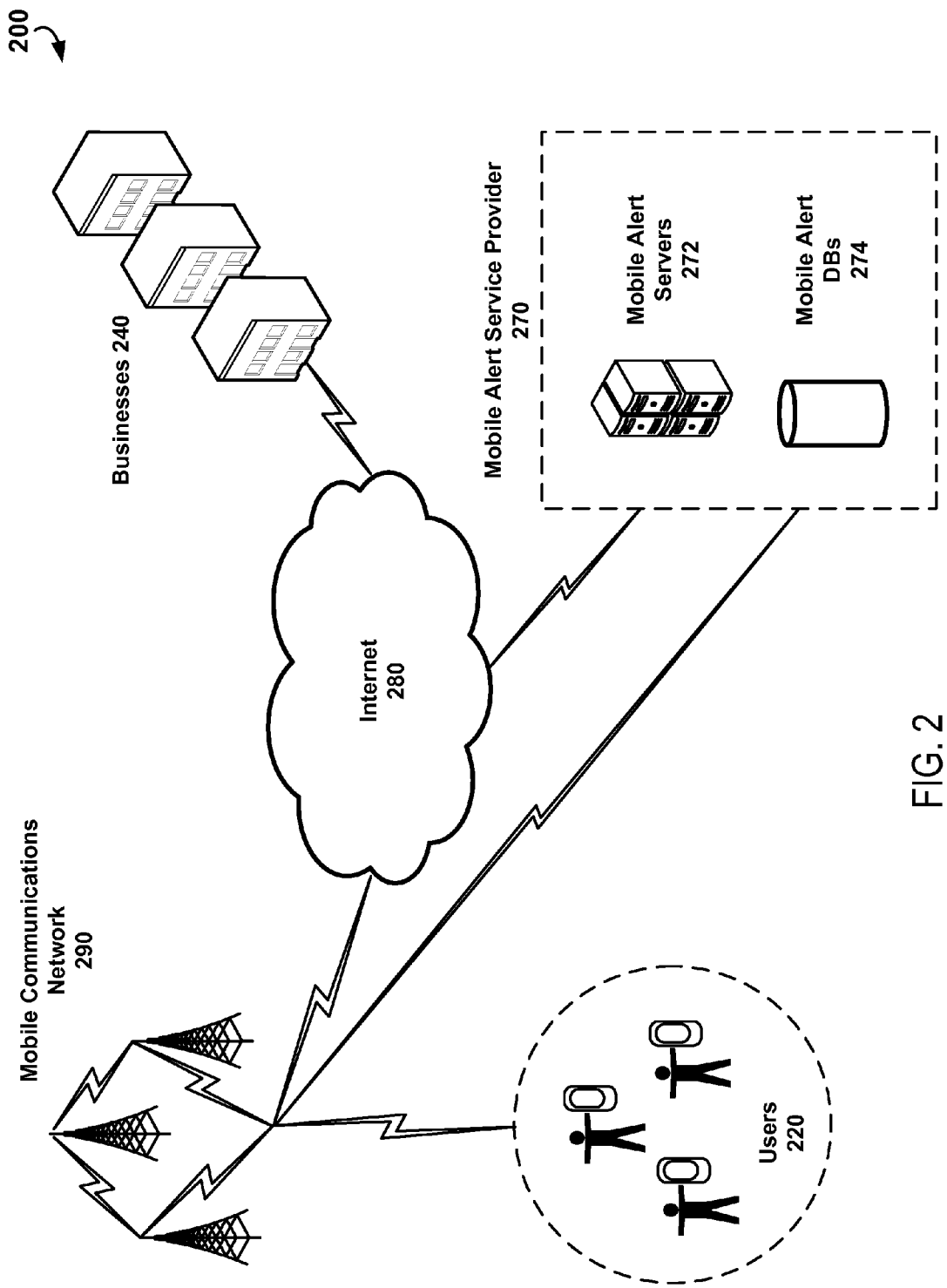
FIG. 2 illustrates an embodiment of a high level overview of a mobile alert service provider and a network configuration through which the provider interacts with users and businesses (or other entities) that provide products and services.

FIG. 2 illustrates an embodiment of a high-level overview 200 of mobile alert service provider 270 and a network configuration through which a provider interacts with users 220 and service and product providers 240.

In the illustrated embodiment, a number of users 220 set alerts for themselves utilizing the services of a mobile alert service provider 270. The alerts includes alert details displayed to the user 220 when the alert is triggered. In an embodiment, the alert details can include any type of text, image, audio or multimedia data capable of being displayed by a user's mobile device. Typically, the alert details includes text that describes the purpose of the alert or prompts the user to perform a task.

In an embodiment, the alerts additionally include alert trigger conditions. Alert trigger conditions define what conditions must occur before the user is sent a specific alert. In an embodiment, each alert includes one or more definitions of a geo-fenced area the user must enter or exit to trigger the alert, and dates and times when the alert can be triggered. In an embodiment, the alerts can include additional parameters such as, for example, an expiration date and the number of times the alert can be triggered.

In the illustrated embodiment, at least some users 220 set alerts for other users. In an embodiment, users 220 can set alerts for any other users. In an embodiment, a user 220 can set alerts for other users only if such other users expressly grant permission to the user to set alerts for them. In an embodiment, a user 220 can set alerts for other users only if such other users have a defined relationship to the user, for example, are "friends" within a social network. In the illustrated embodiment, businesses 240 set alerts for at least some users. In an embodiment, businesses 220 can set alerts for any user 220. In an embodiment, a business 240 can set alerts for a user 220 if the user expressly grants permission to the business to set alerts for the user.

In an embodiment, users 220 and businesses 240 communicate information defining alerts, including alert details and alert trigger criteria, to the mobile alert service provider 270. In various embodiments, users 220 and businesses 240 communicate information defining alerts to the mobile alert service provider 270 by any conventional means such as, without limitation, via the mobile communications network 290 using an app running on users' 220 mobile devices, via the Internet 280 via email or a website provided by the mobile alert service provider 270, by voice message or text message.

In an embodiment, data relating to alerts and user selection criteria are stored and updated on one or more mobile alert databases 274 maintained by the mobile alert service provider 270 via facilities hosted on one or more mobile alert servers 272. In various embodiments, alert details can specify any type of advertisement, promotion or alert that can be delivered to users 220 mobile devices. Such alerts could take the form of, without limitation, text objects, HTML objects, media objects, voice messages and text messages, and could be communicated to users 220 mobile devices via any available means such as, for example, via the Internet 280 or via any other facilities provided by the mobile communications network 290.

In an embodiment, the mobile network 290 provides data relating to all users 220 of the mobile network to the mobile alert service provider 270 on a periodic or continuous basis.

In an embodiment, users 220 explicitly register with the mobile alert service provider 270 and the mobile network 290 only provides data relating to registered users to the mobile alert service provider 270. In an embodiment, users 220 register with the mobile alert service provider 270 and maintain various types of profile and preference information stored on the mobile alert databases 274 via facilities provided by the mobile alert servers 272 such as, for example, a website.

In an embodiment, the facilities hosted on the mobile alert servers 272 utilize data relating to the location of users 220 to track the current location of individual users. In an embodiment, periodically or continuously, facilities hosted on the mobile alert servers 272 matches users 220 whose current geospatial location is known against the trigger criteria of alerts stored on the mobile alert databases 274.

In an embodiment, when the facilities hosted on the mobile alert servers 272 match users 220 to alert trigger criteria for specific alerts stored on the mobile alert databases 274, facilities on the mobile alert servers transmit such alerts to the selected users' 220 mobile devices via any available communications channels suitable for transmitting the alert to the mobile devices. In an embodiment, such channels include the Internet 280 and/or the mobile communications network 290.

In an embodiment, user 220 devices may provide facilities to filter such alerts via alert selection criteria (e.g. specific categories, products, vendors and so forth), such that the user 220 devices automatically delete any alert that does not meet alert selection criteria. In an embodiment, user 220 devices may provide facilities to filter such alerts via alert rejection criteria (e.g. specific categories, products, vendors and so forth), such that the user 220 devices automatically delete any alert that meets alert rejection criteria. In an embodiment, the mobile alert service provider 270 provides facilities, via the mobile alert servers, 272 to maintain preferences for individual users 220 that include alert filtration criteria (e.g. alert selection and/or rejection criteria) such that the mobile alert servers 272 filter alerts initially selected for individual users using the individual user's filtration criteria.

Figure 3:
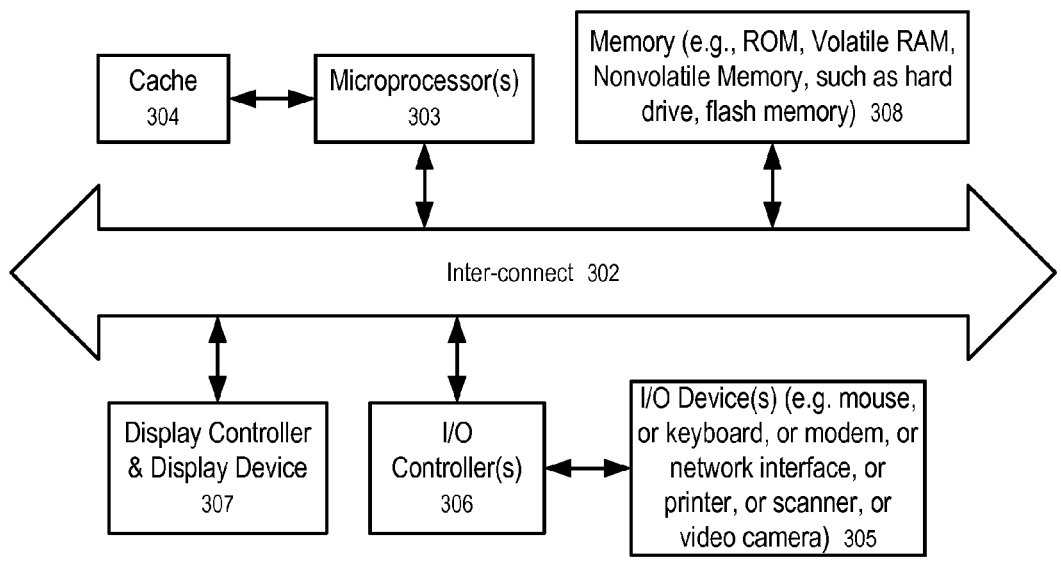
FIG. 3 shows a block diagram of a data processing system that can be used in various embodiments of the disclosed system and method.

FIG. 3 shows a block diagram of a data processing system which can be used in various embodiments of the disclosed system and method. While FIG. 3 illustrates various components of a computer system, it is not intended to represent any particular architecture or manner of interconnecting the components. Other systems that have fewer or more components may also be used.

In FIG. 3, the system 301 includes an inter-connect 302 (e.g., bus and system core logic), which interconnects a microprocessor(s) 303 and memory 308. The microprocessor 303 is coupled to cache memory 304 in the example of FIG. 3.

The inter-connect 302 interconnects the microprocessor(s) 303 and the memory 308 together and also interconnects them to a display controller and display device 307 and to peripheral devices such as input/output (I/O) devices 305 through an input/output controller(s) 306. Typical I/O devices include mice, keyboards, modems, network interfaces, printers, scanners, video cameras and other devices which are well known in the art.

The inter-connect 302 may include one or more buses connected to one another through various bridges, controllers and/or adapters. In one embodiment the I/O controller 306 includes a USB (Universal Serial Bus) adapter for controlling USB peripherals, and/or an IEEE-1394 bus adapter for controlling IEEE-1394 peripherals.

The memory 308 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In an embodiment, the mobile alert servers 272 of FIG. 2 are implemented using one or more data processing systems as illustrated in FIG. 3. In an embodiment, user devices such as user mobile devices 112 and 112 of FIGS. 1 and 220 of FIG. 2 are implemented using one or more data processing system as illustrated in FIG. 3.

In some embodiments, one or more servers of the system illustrated in FIG. 3 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 303 and/or the memory 308. For example, the functionalities described above can be partially implemented via hardware logic in the microprocessor(s) 303 and partially using the instructions stored in the memory 308. Some embodiments are implemented using the microprocessor(s) 303 without additional instructions stored in the memory 308. Some embodiments are implemented using the instructions stored in the memory 308 for execution by one or more general purpose microprocessor(s) 303. Thus, the disclosure is not limited to a specific configuration of hardware and/or software.

Figure 4:
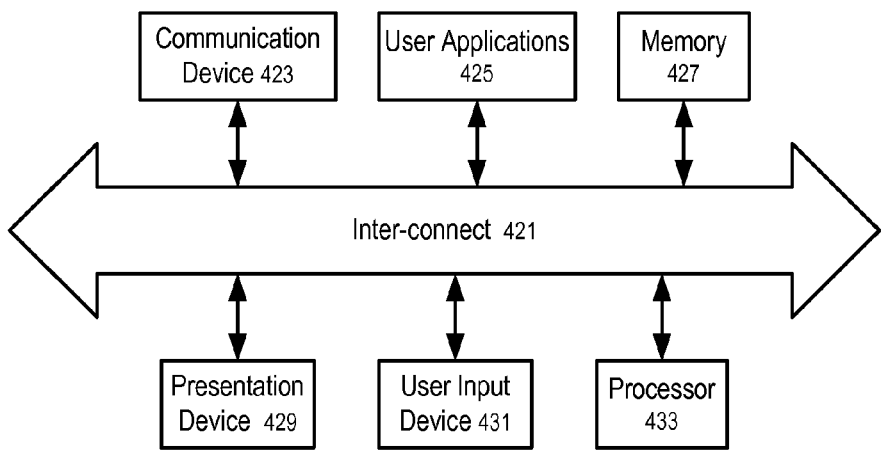
FIG. 4 shows a block diagram of a user device according to one embodiment.

FIG. 4 shows a block diagram of a user device, such as the devices 1112 and 112 of FIGS. 1 and 220 of FIG. 2 according to one embodiment. In FIG. 4, the user device includes an inter-connect 421 connecting a communication device 423, such as a network interface device, a presentation device 429, such as a display screen, a user input device 431, such as a keyboard or touch screen, user applications 425 implemented as hardware, software, firmware or a combination of any of such media, such various user applications (e.g. apps), a memory 427, such as RAM or magnetic storage, and a processor 433 that, inter alia, executes the user applications 425.

In one embodiment, the user applications implement one or more user interfaces displayed on the presentation device 429 that provides users the capabilities to, for example, access the Internet, send and receive messages and/or receive and display alerts transmitted by a mobile alert service provider such as the provider 270 or FIG. 2. In one embodiment, the user applications uses the communication device to communicate with mobile alert servers such as that shown in 272 of FIG. 2 to retrieve data relating to businesses stored in the address book database stored in local memory 427.

In one embodiment, users use the user input device 431 to interacts with the device via the user applications 425 supported by the device, for example, by accessing and interacting with websites, messages and alerts described in detail above with respect to FIGS. 1 and 2. The user input device 431 may include a text input device, a still image camera, a video camera, and/or a sound recorder, etc.

Figure 5:
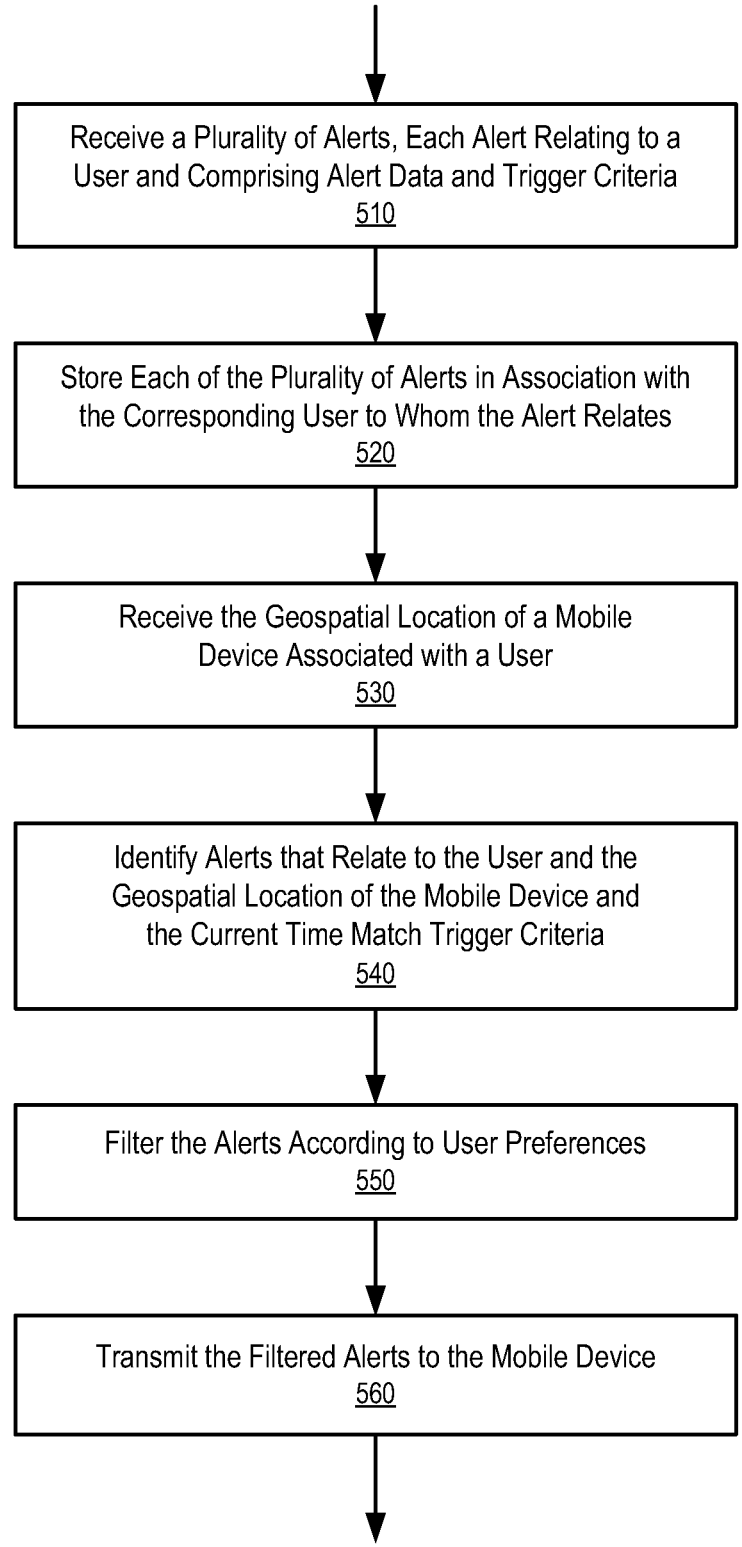
FIG. 5 shows a method for delivering alerts to a user that relate to the user's geospatial location.

FIG. 5 shows a method for delivering alerts to a user that relate to, inter alia, the user's geospatial location. In one embodiment, one or more servers such as the mobile alert servers shown in 272 of FIG. 2 perform the operations of the method shown in FIG. 5, and mobile alert databases such as that shown in 274 of FIG. 2 store the data collected and stored by the method.

In the first operation of the method, one or more processes running on a server receive 510, over a network, a plurality of alerts. Each relates to one user of a plurality of users and comprises alert details and respective alert trigger criteria. In an embodiment, the alerts are received via any conventional means for example, via a mobile communications network, via the Internet and/or an internal network of a mobile alert service provider. In an embodiment, the processes running on a server receive the alerts in any format suitable for transmission of alert details for example, via text messages, voice messages, text files in any format such as XML, multimedia files, emails and so forth.

In an embodiment, at least some alerts are received from the user to whom the alert relates. For example a user might wish to remind himself or herself to:
 Drop off clothes with a dry cleaner on the way home.
 Get a gift for another person on a specific date such as, for example, a reminder to buy jewelry for a spouse a few days before his or her birthday.
 Get gas from a favorite gas station in the next few days.

Alternatively, a user might wish to be alerted to the occurrence of specific conditions that may or may not require action, for example:
 A favorite restaurant is nearby.
 A category of retailer is nearby (e.g. a sporting goods store or a wine store).
 Another user is nearby.

In an embodiment, at least some alerts are received from a user different than the user to whom the alert relates. For example a user might wish to remind another user to:
 Buy milk on the way home.
 Buy a gift for a third person at a specific retailer (e.g. a gift list).
 Drop by when the other user is in the user's neighborhood.

In an embodiment, at least some alerts are received from an entity different than the user to whom the alert relates. For example a business might wish to alert a user that:
 A store where a coupon can be redeemed is nearby.
 A one location of a business having multiple locations is nearby and is open.

In an embodiment, alert details includes data displayed to a user when the alert is triggered. In an embodiment, the alert details can include any type of text, image, audio or multimedia data capable of being displayed by a user's mobile device. Typically, the alert details includes text that describes the purpose of the alert or prompts the user to perform a task such as the examples given immediately above.

In an embodiment, alert trigger criteria comprise at least a definition of a geo-fenced area. In an embodiment, the geo-fenced area specifies a geospatial area in which a user must be present to receive the alert. In an embodiment, the geospatial area is defined using any two or three dimensional format such as, for example:
 A circle or sphere with a fixed radius surrounding a point.
 A rectangle with a fixed dimensions centered on a point.
 The boundaries of a building or a location within a building.
 The boundaries of a neighborhood, a city or a state.
 A road.

In an embodiment, the point on which a geo-fenced area is centered could be an absolute location defined by, for example, a latitude and longitude or GPS coordinates. For example, a geo-fenced area could be a circle having a radius of 0.25 miles centered on GPS coordinates corresponding to the center of a city.

In an embodiment, the point on which a geo-fenced area is centered could be a location of a person, business or other entity defined by, for example, a name or street address. For example, a geo-fenced area could be a circle having a radius of 0.25 miles centered on a street address of a drug store. In an embodiment, where a name maps to a specific location (e.g. a business address, the point on which a geo-fenced area is centered is mapped to such location. In an embodiment, where a name corresponds to a business having multiple locations, the geo-fenced area corresponds to multiple physical locations, each centered on one location of the business. For example, a geo-fenced area could be a circle having a radius of 0.25 miles centered on each location of a supermarket. In an embodiment, where a name corresponds to a person, the point on which a geo-fenced area is centered could be a known address for the person, or could be the real-time location of the person determined by, for example, the geospatial location of a mobile device associated with the person.

In an embodiment, the point on which a geo-fenced area is centered could be a category of persons, places and/or types of businesses, including types of products and services. In an embodiment, where a category that relates to multiple locations and/or persons, the geo-fenced area corresponds to multiple physical locations, each centered on one location of a person or business matching the category. For example, a geo-fenced area could be a circle having a radius of 0.25 miles centered on each location of a business that sells food.

In an embodiment, categories used in alerts correspond to categories selected from a hierarchy of categories. For example, categories that match a supermarket could include.
 Businesses.
 Retailers.
 Food.
 Supermarket.
 Type of Supermarket (e.g. gourmet, full-service, low-price).

In an embodiment, an alert can reference a list of multiple categories of interest, such that the alert is triggered if the user enters a geo-fenced area relating to any one of the categories on the list. In an embodiment, the list of multiple categories of interest represents a hierarchy of preferences. For example, suppose a user needs to buy milk, but has a preference for supermarkets and, in particular, a specific supermarket chain. The alert could be set up with multiple categories including, in order of preference:
 A specific supermarket chain.
 A specific type of Supermarket.
 Supermarkets, in general.
 Food retailers, in general.
 Gas stations.

The alert is triggered if the user enters a geo-fenced area relating to any one of the categories on the list, however, if the user enters a geo-fenced area relating to multiple locations matching one or more of the above categories, the alert is triggered by a business relating to the most preferred category and, in various embodiments, data relating to the business triggering the alert is sent to the user. Thus, in the above example, if the user enters a geo-fenced area relating to several supermarkets, including the user's preferred chain, only data relating to the preferred chain location is sent to the user.

In an embodiment, alert trigger criteria additionally comprise temporal criteria. In an embodiment, temporal criteria comprise periods of time during which an alert can be issued. In an embodiment, temporal criteria can comprise any definition of a period of time. For example:

A date (e.g. Dec. 25, 2011).
A time of day (e.g. 5:00 PM).
A day (e.g. Monday).
A date and time (e.g. 12:00 AM on Jan. 1, 2012).
A range of dates (e.g. Dec. 1, 2011 to Dec. 31, 2011).
A range of dates and times (e.g. Jul. 3, 2011 5:00 PM to Jul. 5, 2011 8:00 AM.
A range of days (e.g. Monday through Friday).
Multiple dates, times, days, and/or ranges of dates, times and days.

In an embodiment, alerts are set up in advance of the dates and times on which the alerts are triggered. For example, a user could, at the beginning of a year, set up alerts for:

An anniversary.
A scheduled vacation.
A holiday.
Multiple birthdays.

In an embodiment, alert trigger criteria can additionally include other criteria that condition how and when an alert is delivered. For example, such other criteria can include:

An expiration date/time for the alert.
The number of times the alert is to be issued.
A period of time to wait between subsequent issuances of the alert.

In the second operation of the method, one or more processes running on the server store 520 each alert of the plurality of alerts on an offer database in association with a respective one user of the plurality of users to which the respective offer relates. In an embodiment, the offer database can be any type of database now known or later to be developed in the art such as, for example, an object oriented database or a conventional RDBMS. In an embodiment, the alerts on the database are indexed by the user to which each alert relates and by alert trigger criteria.

In the third operation of the method, one or more processes running on a server receive 530, over a network, the geospatial location of a mobile device associated with a user. In an embodiment, the geospatial location of the mobile device is received in any format now known or later to be developed in the art such as, for example, latitude and longitude, GPS coordinates, and so forth. In an embodiment, a mobile communication network pushes the location data to the server without an explicit request. In an embodiment, the server issues one or more requests for data to the mobile communications network, for example, for data relating to users known to a mobile alert service provider, or alternatively, for all users known to the mobile communications network.

In the fourth operation of the method, one or more processes running on the server identify 540 at least one alert that relates to the user and whose trigger criteria are met. In an embodiment, the alert's trigger criteria are met where the trigger criteria comprise a geo-fenced area and the geospatial location of the is in the geo-fenced area. In an embodiment, the alert's criteria additionally comprise temporal criteria and the alert's trigger criteria are met where a current date and time associated with the user's mobile device falls within the temporal criteria.

In an embodiment, the alert's trigger criteria additionally comprise other criteria such as, for example:

An expiration date/time for the alert.
The number of times the alert is to be issued.
A period of time to wait between subsequent issuances of the alert.

In an embodiment, such other trigger criteria are met where, for example:

The alert has not expired.
The alert has not been issued a threshold number of times.
A threshold period of time has elapsed since the last time the alert was issued.

In the fifth operation of the method, one or more processes running on the server filter 650 the identified alerts according to user preferences. In an embodiment, user preferences comprise categories for which the user wishes to see alerts.

A category of product or service such as "food," "sushi" or "hairstyling."
A brand.
An interest or hobby.
Another user.

In an embodiment, if an alert does not fall within user preferences, the alert is not transmitted to the user. Additionally or alternatively, user preferences could include topics for which the user does not wish to see offers, such as a disfavored brand. In an embodiment, a user explicitly defines his or her preferences, for example, via a user website provided by the mobile alert service. Additionally or alternatively, the mobile advertising service automatically determines user preferences using user profile data and/or data relating to a user's online activities.

In the sixth operation of the method, one or more processes running on the server transmit 560, over the network, the alert details of the identified alerts to the user's mobile device using facilities provided by the mobile communications network including, without limitation, text messaging, voice messaging and/or multimedia messaging capacities provided by the network. In an embodiment, the users' mobile devices receive and display alerts by opening an application designed for displaying alerts. In an embodiment, the mobile alert service transmits alerts as text messages that are sent to the user's inbox. In an embodiment, the mobile alert service transmits alerts as flash files that are immediately displayed by user mobile devices without any action on the part of the user.

In an embodiment, the alerts are transmitted to multiple devices associated with the user, for example, to each mobile device owned by a user, even where such devices do not meet trigger criteria. In an embodiment, the alerts are transmitted to multiple channels associated with the user and/or the user's mobile device, for example, as an SMS text message to the user's mobile device, as alert details to an alert app running on the user's mobile device and an email account associated with the user.

In an embodiment, the alert detail are supplemented with additional information that relates to the alert and/or the specific conditions that triggered the alert. In an embodiment, additional information comprises information relating to one or more locations to which the alert relates. For example, where an alert relates to a category of products or services and the alert is triggered in response to determining that a specific retailer within that category is present within the geo-fence of the trigger criteria of the alert, the additional information includes information identifying or describing the retailer. See, for example, the alerts shown in 162-168 of FIG. 1. In an embodiment, additional information comprises information relating to one or more locations a user or entity who created the alert, if different from the user to whom the alert is directed. See, for example, alert 166 of FIG. 1.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    receiving, over a network by an alert service system, a plurality of alerts, each respective alert of the plurality of alerts relating to a respective one user of a plurality of users and comprising respective alert details and respective alert trigger criteria, the respective alert trigger criteria comprising a definition of a respective geo-fenced area and respective temporal critera;
    receiving, over the network by the alert service system, a device geospatial location for a mobile device associated with one user of the plurality of users;
    identifying, by a computing device of the alert service system, at least one alert of the plurality of alerts that relates to the one user of the plurality of users based on the device geospatial location being in the respective geo-fenced area of the at least one alert and a current time associated with the mobile device matching the respective temporal criteria of the at least one alert, wherein the at least one alert was set for the one user by a third party having a permission granted by the one user to the third party to set one or more alerts for the one user, wherein the third party is a non-business user of the plurality of users;
    retrieving, from one or more repositories, additional information that relates to the respective alert details;
    filtering, by the alert service system, the at least one alert of the plurality of alerts based on the additional information that relates to the respective alert details; and
    transmitting, over the network by the alert service system, the respective alert details of the filtered at least one alert to the mobile device.

2. The method of claim 1, wherein for the at least one alert of the plurality of alerts, the respective geo-fenced area of the respective alert comprises a respective geometrical figure centered on a respective geospatial point.

3. The method of claim 2, wherein the respective geometrical figure is selected from the list:
    a circle with a fixed radius centered on the respective geospatial point, and a rectangle with fixed dimensions centered on the respective geospatial point.

4. The method of claim 2, wherein the at least one alert of the plurality of alerts, the respective geo-fenced area of the respective alert comprises boundaries of a respective geospatial area.

5. The method of claim 4, wherein the respective geospatial area is selected from the list: a building, location within a building, a neighborhood, a city, a state and a road.

6. The method of claim 2, wherein the respective geospatial point is an absolute location defined by one of: latitude and longitude, GPS coordinates and street address.

7. The method of claim 2, wherein the respective geospatial point corresponds to a name for a second user that is mapped to the location of a second mobile device associated with the second user.

8. The method of claim 2, wherein the respective geospatial point corresponds to a name for an entity having at least one fixed location, wherein the geospatial point is mapped to the at least one fixed location.

9. The method of claim 8, wherein the respective alert details of the at least one alert transmitted to the at least one user are supplemented with additional information that relates to the entity.

10. The method of claim 2, wherein the respective geospatial point corresponds to a category, wherein the geospatial point is mapped to the location of at least one entity that is associated with the category.

11. The method of claim 10, wherein the respective alert details of the at least one alert transmitted to the at least one user are supplemented with additional information that relates to the at least one entity.

12. The method of claim 1, wherein for the at least one alert of the plurality of alerts, the respective temporal criteria of the respective alert is selected from the list: a respective date, a respective time, a respective date and time, a respective day of the week, a respective range of dates, a respective range of times, a respective range of dates and times and a range of days of the week.

13. The method of claim 1, wherein the at least one alert of the plurality of alerts was received, over the network, from the one user of the plurality of users.

14. The method of claim 1, wherein the at least one alert of the plurality of alerts was received, over the network, from a second user of the plurality of users different than the one user of the plurality of users.

15. The method of claim 1, wherein for the at least one alert of the plurality of alerts, the trigger criteria additionally comprise a respective number of times to transmit the respective alert, wherein if the at least one alert of the plurality of alerts has been transmitted the respective number of times, the respective alert is not transmitted to the one user of the plurality of users.

16. The method of claim 1, wherein prior to transmitting the alert details, the method comprises:
storing, by the computing device, the plurality of alerts, such that each respective offer of the plurality of offers is stored in association with a respective one user of the plurality of users to which the offer relates.

17. The method of claim 1, wherein the additional information that relates to the respective alert details comprises user preferences associated with the user and wherein filtering the at least one alert comprises:
filtering, by the computing device, the at least one alert using the user preferences associated with the user, such that where the at least one alert matches the user preferences, an offer is transmitted to the mobile device associated with the user, and where the at least one alert does not match the user preferences, the offer is not transmitted to the mobile device associated with the user.

18. The method of claim 17, wherein the user preferences comprise at least one of: a range of times, interests of the user, online activities of the user, and keywords specified by the user.

19. A non-transitory computer-readable storage medium storing computer-readable instructions, which when executed, cause a system to perform:
receiving, over a network, a plurality of alerts, each respective alert of the plurality of alerts relating to a respective one user of a plurality of users and comprising respective alert details and respective alert trigger criteria, the respective alert trigger criteria comprising a definition of a respective geo-fenced area and respective temporal criteria;

receiving, over the network, a device geospatial location for a mobile device associated with one user of the plurality of users;

identifying at least one alert of the plurality of alerts that relates to the one user of the plurality of users based on the device geospatial location being in the respective geo-fenced area of the at least one alert and a current time associated with the mobile device matching the respective temporal criteria of the at least one alert, wherein the at least one alert was set for the one user by a third party having a permission granted by the one user to the third party to set one or more alerts for the one user, wherein the third party is a non-business user of the plurality of users;

retrieving, from one or more repositories, additional information that relates to the respective alert details;

filtering, by the system, the at least one alert of the plurality of alerts based on the additional information that relates to the respective alert details; and transmitting, over the network, the respective alert details of the filtered at least one alert to the mobile device.

20. A computer system comprising:

a memory; and at least one processor coupled to the memory to:
receive, over a network, a plurality of alerts, each respective alert of the plurality of alerts relating to a respective one user of a plurality of users and comprising respective alert details and respective alert trigger criteria, the respective alert trigger criteria comprising a definition of a respective geo-fenced area and respective temporal criteria;

receive, over the network, a device geospatial location for a mobile device associated with one user of the plurality of users;

identify at least one alert of the plurality of alerts that relates to the one user of the plurality of users based on the device geospatial location being in the respective geo-fenced area of the at least one alert and a current time associated with the mobile device matching the respective temporal criteria of the at least one alert, wherein the at least one alert was set for the one user by a third party having a permission granted by the one user to the third party to set one or more alerts for the one user, wherein the third party is a non-business user of the plurality of users;

retrieving, from one or more repositories, additional information that relates to the respective alert details;

filtering the at least one alert of the plurality of alerts based on the additional information that relates to the respective alert details; and transmit, over the network, the respective alert details of the filtered at least one alert to the mobile device.

* * * * *